No. 796,188. PATENTED AUG. 1, 1905.
F. M. CARROLL.
TROLLEY WHEEL BUSHING.
APPLICATION FILED MAR. 20, 1905.

Witnesses: Fred. M. Carroll, Inventor.

UNITED STATES PATENT OFFICE.

FRED MERCHANT CARROLL, OF NEW HAVEN, CONNECTICUT, ASSIGNOR TO THE H. B. IVES CO., OF NEW HAVEN, CONNECTICUT, A CORPORATION.

TROLLEY-WHEEL BUSHING.

No. 796,188.      Specification of Letters Patent.      Patented Aug. 1, 1905.

Application filed March 20, 1905. Serial No. 250,927.

*To all whom it may concern:*

Be it known that I, FRED MERCHANT CARROLL, a citizen of the United States, residing at New Haven, in the county of New Haven and State of Connecticut, have invented a new and useful Improvement in Trolley-Wheel Bushings; and I do hereby declare the following, when taken in connection with the accompanying drawings and the numerals of reference marked thereon, to be a full, clear, and exact description of the same, and which said drawings constitute part of this specification, and represent, in—

Figure 1:
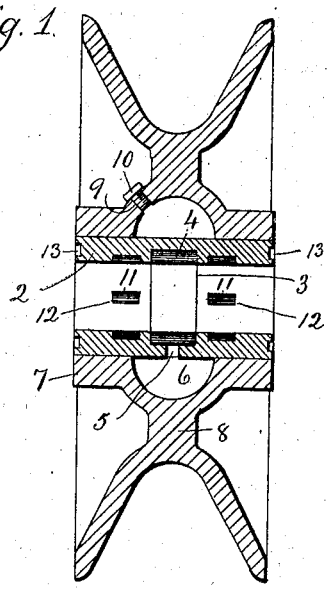
Figure 3:
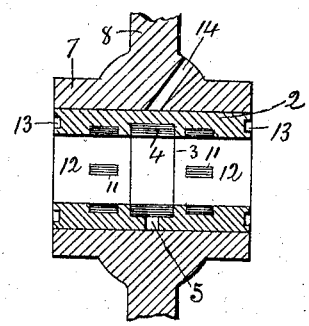
Figure 2:
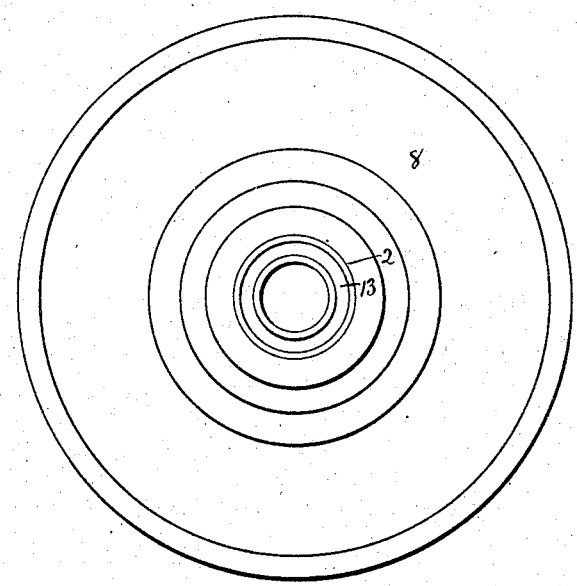

Figure 1, a view in vertical section of a trolley-wheel furnished with a bushing constructed in accordance with my invention; Fig. 2, a view thereof in side elevation; Fig. 3, a broken sectional view showing a modified form of the trolley-wheel.

My invention relates to an improvement in trolley-wheel bushings, the object being to produce a self-lubricating bushing of superior efficiency and durability.

With these ends in view my invention consists in a trolley-wheel bushing having certain details of construction, as will be hereinafter described, and pointed out in the claim.

In carrying out my invention as herein shown I provide an otherwise ordinary bushing 2 with an internal annular packing-recess 3, located midway between its ends, for the reception of an absorbent packing 4 of any material suitable for absorbing and carrying oil supplied to it through a small radial feed-hole 5 at its outer end opening into an annular oil-chamber 6, formed in the hub 7 of the trolley-wheel 8. A feed-hole 9, leading into the said chamber 6, is provided for filling the same and normally closed by a screw-plug 10. I also form the bushing 2 with two groups of graphite-receiving pockets 11, the inner ends of which are located close to, but isolated from, the edges of the annular recess 3. As shown, these pockets are symmetrically arranged on opposite sides of the said recess 3, each group of pockets comprising four pockets arranged equidistant from each other, oblong in form, and extending lengthwise with the axis of the bushing 2; but whatever the particular shape of the pockets and however arranged there will always be between their outer ends and the ends of the bushing unbroken annular bearing-surfaces 12. These surfaces 12 form a portion of the internal periphery of the bushing, but are especially designated for the reason that the provision for lubrication is designed with particular reference to leaving these portions of the internal surface of the bushing unbroken, so that at the ends of the bushing, where the tendency to wear is the greatest, the integrity of the bearing-surfaces will be untouched. In explanation of this it may be said that the strain and wear of a trolley-wheel bushing is more severe at its ends than elsewhere and that consequently it is desirable that the bushing should not be internally cut away at its ends for the purpose of introducing lubricating material. The extreme ends of the bushing are formed with annular grooves 13 for the reception of graphite.

The operation of my improved bushing is as follows: Oil having been supplied to the packing 4 in the recess 3 and graphite having been introduced into the pockets 11, a film of the oil works outward over the outer edges of the recess 3 into the inner ends of the pockets, whereby a modicum of oil is continuously supplied to the graphite, the lubricating qualities of which are thereby increased.

Instead of forming the trolley-wheel with an oil-chamber 6 it will be sufficient to form the hub of the wheel with an oil-passage 14, as shown by Fig. 3. Then by bringing the feed-hole 5 of the bushing into registration with the inner end of the passage 14 the packing 4 may be charged with oil sufficient to last for a long time.

In view of the modification suggested and of others which may obviously be made I would have it understood than I do not limit myself thereto, but hold myself at liberty to make such departures therefrom as fairly fall within the spirit and scope of my invention.

Having fully described my invention, what I claim as new, and desire to secure by Letters Patent, is—

A trolley-wheel bushing having an internal annular recess located midway of its length for the reception of an absorbent packing, and graphite-receiving pockets located on opposite sides of the said recess and separated therefrom, the outer ends of the said pockets being separated from the ends of the bushing by unbroken annular bearing-surfaces to withstand the wear of the axle in the bushing.

In testimony whereof I have signed this specification in the presence of two subscribing witnesses.

FRED MERCHANT CARROLL.

Witnesses:
FRED. C. EARLE,
GEORGE D. SEYMOUR.